Nov. 10, 1959 H. C. LEECH 2,912,018
AERATION OF LIQUIDS
Filed July 31, 1957 4 Sheets-Sheet 1

INVENTOR:
HAROLD C. LEECH
BY:
Norris & Bateman
ATTORNEYS

Nov. 10, 1959 H. C. LEECH 2,912,018
AERATION OF LIQUIDS
Filed July 31, 1957 4 Sheets-Sheet 2

INVENTOR:
HAROLD C. LEECH
BY:
Norris & Bateman
ATTORNEYS

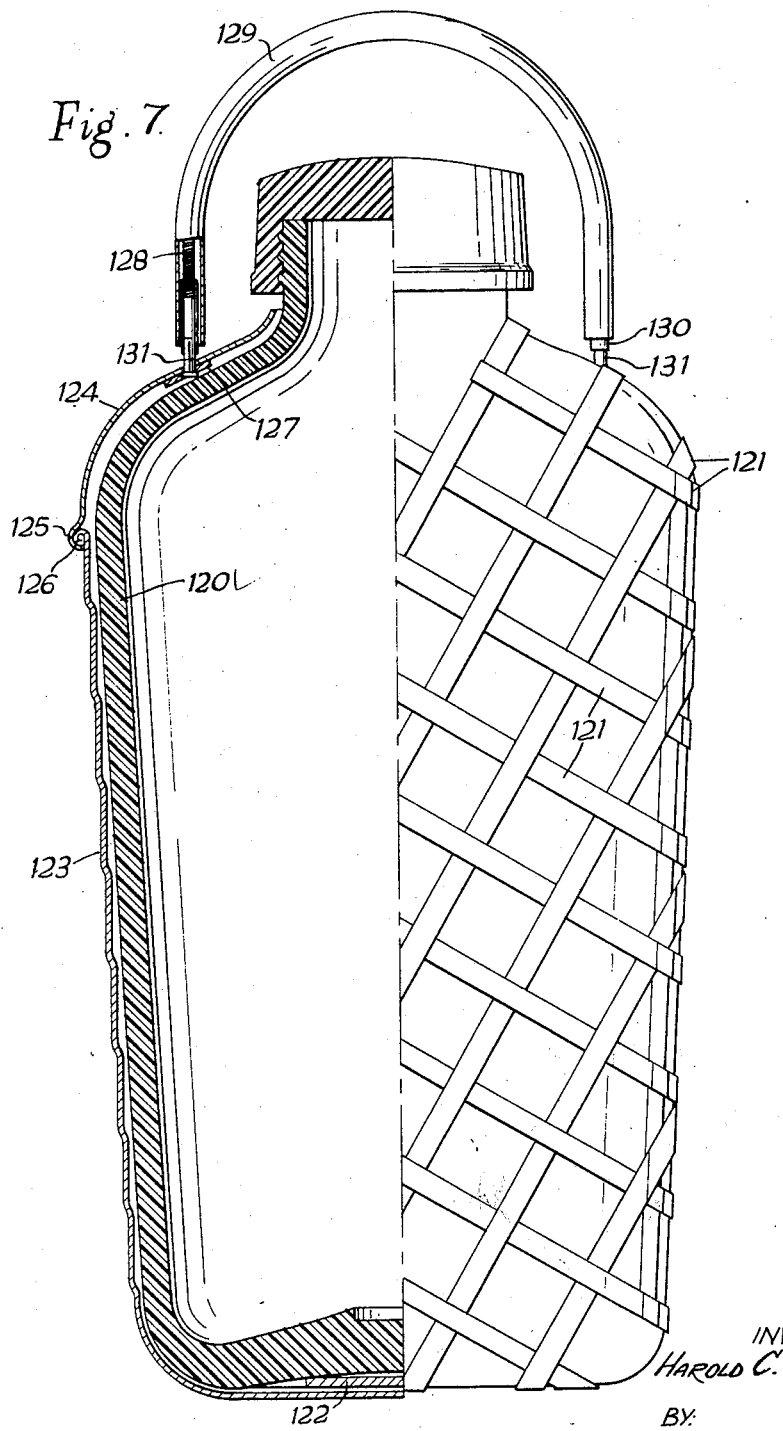

United States Patent Office 2,912,018
Patented Nov. 10, 1959

2,912,018

AERATION OF LIQUIDS

Harold Cayzer Leech, Montclair, Durban, Union of South Africa, assignor to Syfonex (Pty) Limited, Montclair, Durban, South Africa, a company of South Africa Application July 31, 1957, Serial No. 675,433

Claims priority, application Great Britain August 3, 1956

6 Claims. (Cl. 141—18)

This invention relates to the aeration of liquids, and whilst it is primarily intended for producing carbonated water for use as a drink either alone or with other liquids or with flavouring substances added thereto, it can also be applied to aerating liquids for other purposes, for example for fire extinguishers and other liquid dispensers.

One method for making soda water in a siphon is to add two reactant powders, e.g. citric acid and sodium bicarbonate, to water in the siphon, the reaction producing $CO_2$ gas and causing the gas to intermingle with the water and also provide the necessary pressure for discharging the aerated water from the siphon. This method suffers from the disadvantage that on account of the contact of the reactant charges with the water, the resultant aerated water is a sodium citrate solution, and although this may not be objectionable if it is to be used to make a beverage with fruit juices or the like, the flavour is undesirable when the aerated water (soda water) is intended for use with alcoholic beverages.

The more usual method of carbonating water in a siphon is to employ liquified $CO_2$ gas, which is tapped off from large $CO_2$ cylinders in the mineral water factory producing the siphons, or which can be obtained in small bullet shaped containers for use by the actual user of the siphon. However this method involves the use of some form of gas cylinder which it is one of the objects of this invention to avoid, for two reasons, one being that either the factory or the user has to purchase the cylinders, and the other being that the reaction between the metal cylinders and the $CO_2$ gas produces an objectionable taste in the carbonated liquid.

According to the present invention, an aerated liquid of a high degree of purity is produced by mixing acid and alkali reactants with water in a reaction vessel and passing the gas formed by the reaction through a liquid tight seal into the liquid to be aerated in a container. With this method, the aerated liquid will not be contaminated by the reactants, and consequently carbonated water produced in this way will be entirely satisfactory for all purposes. Furthermore, aerated liquid produced by this method in a fire extinguisher will not have the deleterious effects on, for example, textile materials, as occurs with many known fire extinguishers.

Apparatus for carrying out the invention preferably comprises a container having an outlet pipe extending from a position near to the bottom of the container to an outlet valve, a reaction vessel adapted to be mounted within the container, and means for permitting the escape of gas from the reaction vessel into the container, but preventing the escape of liquid or solid matter from the reaction vessel.

Several forms of apparatus for carrying out the invention and the method of using them will now be described as examples, with reference to the accompanying drawings, in which:

Figure 7 is a half sectional view of a container, with a cover removed from the unsectioned half to show the method of reinforcing the container, and Figure 8 is an "exploded" detail view of an outlet valve.

Figure 1:
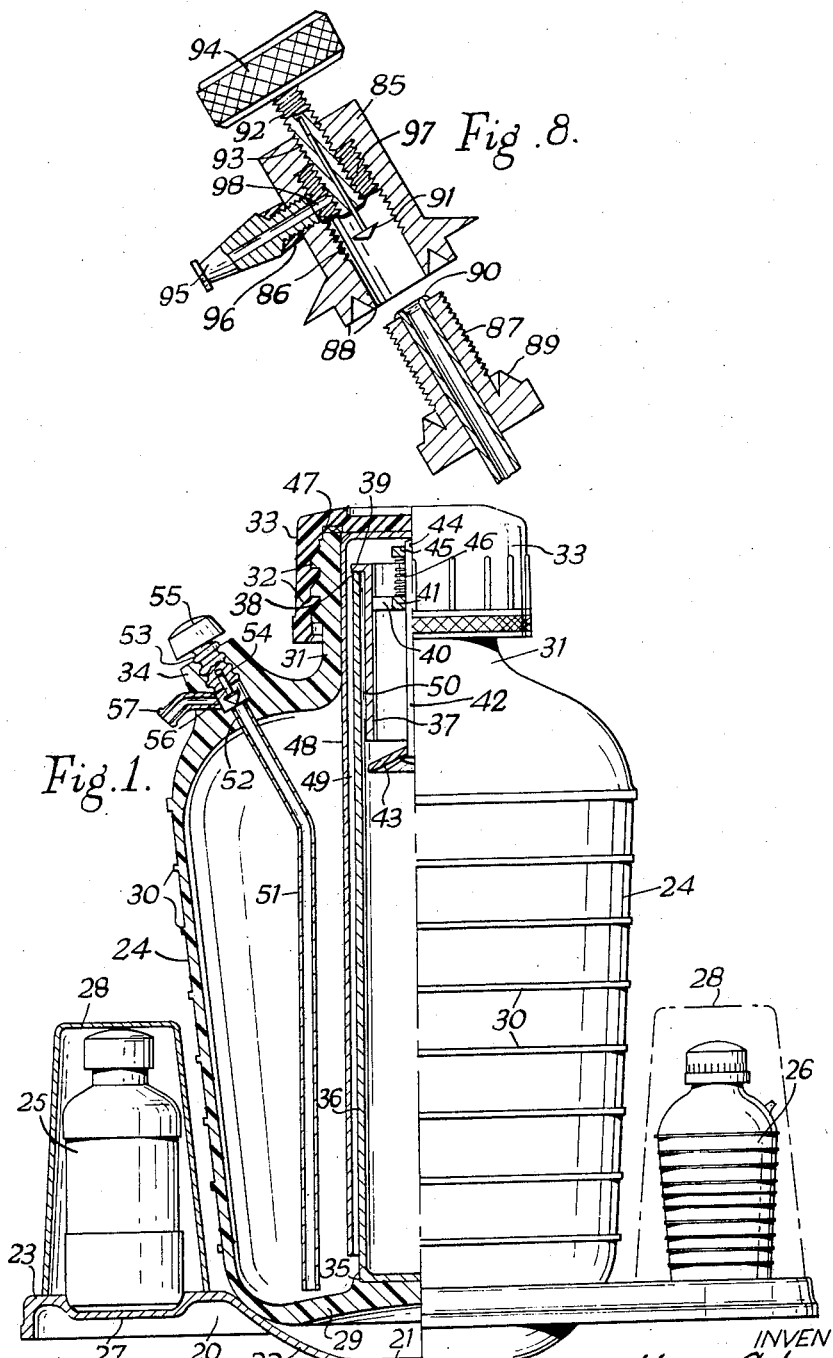
Figure 1 is a half sectional view through apparatus for producing aerated liquids, mounted on a stand.

Referring firstly to the arrangement shown in Figure 1, a stand 20, which may be moulded in a suitable plastics material, has a base portion 21 on which it rests, a spherically dished portion 22, and an annular flange 23. The lower end of a container 24 rests in the dished portion 22, and a series of bottles or flavour dispensers such as those illustrated at either 25 or 26 rest in circular recesses 27 formed in the flange 23, whilst a series of drinking glasses 28 are supported in an inverted position on the flange 23.

The container 24 is moulded in polythene of high strength, or in any other mouldable material, such as toughened glass, which will withstand considerable internal pressure. The bottom 29 of the container is inwardly dished for greater strength (and to allow for some expansion under pressure if the container is made in a resilient material such as polythene) whilst reinforcing ribs 30 are formed around the exterior of the container. At its upper end the container has a neck 31 provided with screw threads 32 adapted to receive an internally screwed cap 33, and an outlet boss 34 moulded integral with the container is bored to receive an outlet valve and nozzle as will be hereinafter described in detail.

A recess 35 in the inside face of the container bottom 29 accommodates the lower end of an open topped inner container 36, which forms the reaction vessel in this example whilst a charge vessel 37 has a flange 39 which rests on the upper end of the inner container so that there is an annular space 50 between the charge vessel and the inner container below the flange 39. Arms 40 formed on the inside of the vessel 37 carry a boss 41 within the bore of which a valve rod 42 is axially slidable. A conical valve member 43 is rigidly attached to the lower end of the rod 42 by welding, and a pin 44 projecting from the rod 42 near its upper end, rests on a pressure block 45, a compression spring 46 being disposed between the boss 41 and the block 45.

A rubber sealing ring 47 is fixed to the inside of the cap 33 in such a position that it is pressed against the upper edge of the neck 31 when the cap is screwed on to the neck, and forms a gas tight joint with the neck 31 when the cap is screwed tight. (In some cases if the cap 33 is moulded in resilient material such as polythene, this rubber sealing ring may not be necessary.) Also fixed to the inside of the cap 33 is a shroud 48 which is in the form of a cylinder open at the bottom, and extending almost to the bottom of the container 24 when the cap is screwed down, as shown in Figure 1. It will be noticed that the bore of the shroud 48 is of such a size that there is an annular space 49 between the shroud and the inner container 36, and this space 49 is in communication with the inside of the inner container 36 through the gap 38 and the annular space 50.

It will also be noticed by reference to Figure 1 that when the cap 33 is screwed on the neck 31, the top of the shroud 48 presses on the upper end of the valve rod 42, and holds the latter down so that the valve member 43 is clear of the lower end of the vessel 37.

An outlet pipe 51 (which is preferably a flexible polythene tube) extends downwardly from a hole 52 in the boss 34, into which the upper end of the pipe 51 is pressed, to a position near to the bottom of the container. An outlet screw 53 having a knob 55 engages in a screwed hole 54 in the boss 34, and carries a metal valve plug 56, which can be pressed into engagement with the upper end of the pipe 51 by turning the knob 55 and screw 53. The upper end of the hole 52 is chamfered, so that the upper end of the pipe 51 is deformed outwardly when engaged by the conical end of the plug 54, thereby forming a valve seat. An outlet nozzle 57 is fitted in the boss 34, and the bore of the nozzle communicates with the screwed hole 54.

The bottles 25 or 26 which are arranged around the container 24, on the stand 20, are filled with concentrated flavour, fruit juice or sweetening matter. These bottles are made in flexible polythene, and are provided with very small outlet holes, so that by squeezing any particular bottle, a few drops of its contents can be ejected through its outlet hole. The bottle illustrated at 26 in Figure 1 is intended to be a miniature shaped copy of the central container 24.

The method of producing aerated beverages using the apparatus shown in Figure 1 will now be described with reference to Figures 1 to 5.

Figure 2:
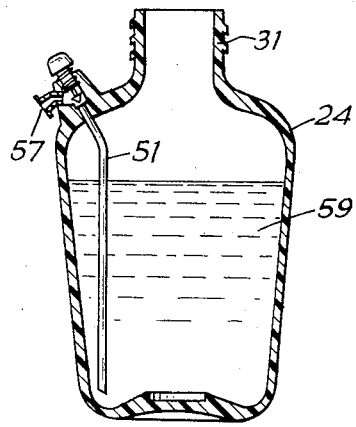
Figures 2, 3, 4 and 5 are diagrams showing stages in the charging and operation of the apparatus shown in Figure 1.

The cap 33 is unscrewed and removed taking with it the shroud 48, the inner container 36 and vessel 37 are also removed, and water is poured into the container 24 up to a level indicated by suitable indication means, such as a bright yellow polythene pendant which is attached at the top of the dip tube and immediately below the valve indicating the correct water level. This stage is indicated at Figure 2, the water being indicated at 59. Also at this stage, if it is desired to produce a considerable quantity of flavoured aerated liquid, approximately two fluid ounces of the appropriate flavoured and sweetened concentrate from one of the bottles 25 or 26 are added to the water. If a pure soda water is required or if the apparatus is to be used as a fire extinguisher, then it is not necessary to add any flavour to the water, and similarly, if the liquid in the container is to be used with a variety of drinks, then no flavour is added at this stage, the necessary drops of the appropriate flavour being poured into the drinking glass before the addition of the aerated water in such a case.

Figure 3:
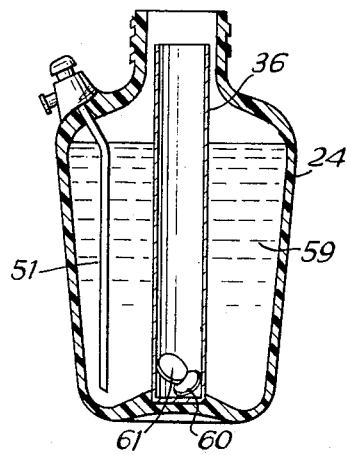
Figure 4:
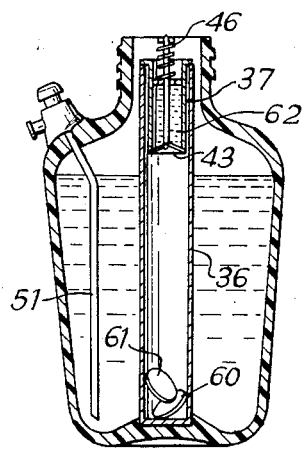

The inner container 36 is then placed in the container 24 and two tablets 60 and 61 are placed in the tube 36. These tablets form the reactants for producing the aeration gas, and one comprises an acid whilst the other comprises an alkali (e.g. citric acid and sodium bicarbonate respectively). This stage is illustrated in Figure 3.

Whilst reference has been made above to two tablets 60 and 61, it may be necessary to use a larger number of such tablets depending upon the size of the tablets and the volume of liquid which it is desired to aerate.

Figure 5:
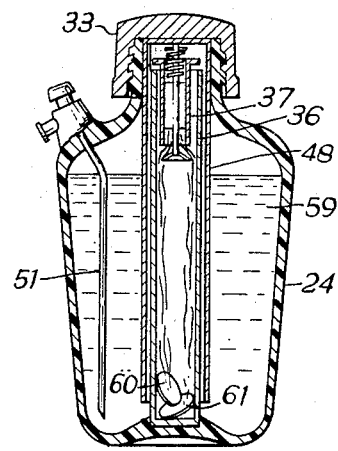

The charge vessel 37 is then filled with water 62 (see Figure 4) and placed in the inner container so that the annular flange 39 rests on top of the inner container 36. It will be observed that the spring 46 holds the valve rod 42 in such a position that the valve member 43 is pressed against the lower end of the vessel 37, and prevents escape of the water 62. Finally, the cap 33 and shroud 48 are placed over the inner container 36, and the cap screwed down as shown in Figure 5. The plunger 42 is depressed by the screwing down of the cap, and the valve member 43 moved away from the lower end of the vessel 37, thereby allowing the water 62 to fall into the container 36 to cause a reaction between the tablets 60 and 61. This reaction produces $CO_2$ gas which rises in the container 36 and passes through the annular spaces 50 between the charge vessel 37 and the inner container 36. The pressure of the carbon dioxide gas thus generated raises the flange 39 off of the end of the inner container 36 so that the gas is permitted to escape into the annular space 49 and pass down into the water 59 in the container 24. Thus, it will be appreciated that the charge vessel 37 functions substantially as a check valve in that the gases generated in the inner container will cause the sealing surface of the flange 39 to be separated from the upper end of the inner container 36. Because there is a considerable pressure built up inside the container by the gas, the water 59 is effectively aerated, but the gasification process is speeded up if the container 24 is given a rocking or combined rocking and gyratory motion. The dished portion 22 of the stand 20 facilitates such a combined rocking and gyratory motion. It will be understood that the outlet valve must be kept closed during the period of aeration to prevent escape of gas and liquid. Once the aeration process is complete, the gas in the container will place the interior of the container under pressure, and thereafter, when a drink is required it is only necessary to unscrew the screw 53 to lift the valve plug 56 off its seat, and the liquid 59 will be forced out of the container 24 through the outlet pipe 51.

It will be appreciated that the essential apparatus in the example just described is the container 24 and its various fittings. The stand 20 is an optional feature and could be dispensed with without impairing the effectiveness of the apparatus. It might also be mentioned here that if the container is placed on a sponge rubber pad, the rocking motion desirable for quick aeration is very easy to apply.

In the alternative arrangement shown in Figure 6, the container 24 (indicated in chain dotted lines) is constructed as described with reference to Figure 1, excepting that a somewhat different form of screw thread on the neck 31 for the reception of the cap is provided, but it will be appreciated that this is a mere detail and either form of thread illustrated in Figures 1 and 6 could be used. A cap 70 is provided adapted to be screwed on to the neck 31 of the container 24, and an internally screwed gland 71 for the reception of a screwed valve rod 72 is provided in the cap. A handle 73 is provided at the upper end of the rod 72, and a conical valve member 74 similar to the valve member 43 in the previous example is fixed to the lower end of the rod 72.

A charge vessel 75 is fixed to a closure member 76 which is screwed on to the gland 71, and the lower end of this vessel is adapted to be closed by the valve member 74 when the rod 72 is screwed upwardly.

A flexible polythene bag 77 is provided and forms the reaction vessel replacing the inner container 36 described in the previous example. This bag 77 is shown in Figure 6 attached to the charge vessel 75, by placing the open necked end of the bag over the lower end of the vessel, and then placing two rubber bands 78 around the neck portion of the bag.

When this arrangement is to be charged, the cap 70 with the charge vessel 75 and the bag 77 is withdrawn from the container 24, and the latter is partially filled with water as described in the previous example. The bag 77 is then removed from the vessel 75 (this can easily be done by rolling the rubber bands 78 up the exterior of the vessel 75 to a position where they are clear of the bag), and two reactant tablets are placed in the bag. The valve rod 72 is then screwed down until the valve member 74 is clear of the vessel 75 when the latter is inverted and filled with water. The valve rod is then screwed to bring the valve member 74 into the closed position, after which the vessel 75 is inserted into the neck of the bag 77, the rubber bands 78 rolled down over the neck of the bag, and the whole assembly of vessel 75 and bag 77 inserted into the container 24 and the cap 70 screwed down.

When the valve handle 73 is turned, the valve member 74 will move away from the vessel 75 and allow the charge of water in the latter to fall into the bag 77 to cause reaction between the acid and alkaline tablets producing the $CO_2$ gas. When a sufficient gas pressure has built up in the bag 77, the gas will leak between the bag and the vessel 75 (forcing the rubber bands 78 outwardly) and will aerate the water in the container 24 as described in the previous example.

The construction of the outlet valve of Figure 8 is slightly different from that shown in Figure 1. A valve housing 85 is internally screwed as at 86 to receive a screwed gland member 87, in which the upper end of the outlet pipe 84 is fixed. The valve housing 85 and the gland member 87 are provided with pointed rims 88 and 89 respectively, the purpose of these rims being to bite into the polythene wall of the container when the housing and gland member are screwed together, the one on the outside and the other on the inside of the container.

The upper end of the outlet pipe 84 is curled over as shown at 90 to form a valve seating. A conical valve plug 91 engageable with the seating 90 is carried by a screw 92 which engages with a screwed hole 93 in the housing 85 and at the outer end is provided with a knob 94. A nozzle 95 is fitted in the housing 85, and a sealing ring 96 of resilient material such as polythene is compressed between the housing 85 and part of the nozzle 95 as shown in Figure 8. A screwed polythene gland 97 is fitted in the housing 85 and a hole 98 in this gland communicates with the bore of the nozzle 95. It will be observed by reference to Figure 8 that liquid can only escape from the nozzle 95 when the screw 92 uncovers the hole 98, whilst if the screw is turned too far then the conical plug 91 will close the screwed hole in the gland 97 and prevent the escape of liquid.

The container construction shown in Figure 7 is applicable to both the arrangements previously described, and therefore no particular form of charging or of outlet valve is shown.

A container 120 is made in moulded polythene, and is wrapped by an open weave metallic reinforcement 121, which adds strength to the resistance of the container to bursting under high internal pressure. The whole container including its metallic reinforcing 121 is encased in a bucket shaped metal cover 123, and a metal top cover 124, the lower rim 125 of which is rolled over a lip 126 formed at the upper end of the cover 123. A pad of reinforcing material 122 such as that sold under the trade name "Masonite" is placed in the bottom of the cover 123 to prevent bulging of the cover under the internal pressure. It will be noted that the cover 123 is stepped, this construction giving rigidity to the cover, and also that there is a gap between the container 120 and the covers 123 and 124, the purpose of this gap being to allow for expansion of the container 120.

This container shown in Figure 7 is provided with a carrying handle which also serves as a measuring device for indicating the quantity of liquid in the container. A stud 131 is passed through the top cover 124 so that its head engages with a washer 127 on the inside of the cover 124 (one of these studs being provided at each side of the container). A tension spring 128 is secured at its ends to the two studs 131, and a handle 129 encloses this spring. Graduations 130 are marked on the one or both studs.

If the handle is gripped, and the whole apparatus lifted, the spring 128 will be extended in proportion to the weight of the container and its contents and this will determine the length of the studs 126 which will be exposed by the handle 129. Hence the position of the lower ends of the handle relative to the graduations on the studs corresponds with the weight of liquid in the container.

It will, of course, be understood that the apparatus is capable of many modifications in detail, and certain parts described above with reference to one construction are applicable to other constructions. Also whilst the reactants have been described as being in tablet form they could be in any other convenient form (e.g. they could be provided as powders or pastes or even in liquid form, suitable containers being also provided in each case). In the case of the apparatus described with reference to Figure 6, the bag 77 could be supplied in a folded condition, with powdered reactants already enclosed, the folds of the bag separating the reactants to prevent premature reaction with moisture absorbed from the air in the bag.

It is not necessary to modify the apparatus or the method of charging in order to use it as a fire extinguisher. The gas pressure produced in the container is sufficient to provide a convenient jet for this purpose. Moreover, when the container is made from polythene, the apparatus can be used to extinguish electrical fires without danger of electrocution of the operator.

Figure 6:
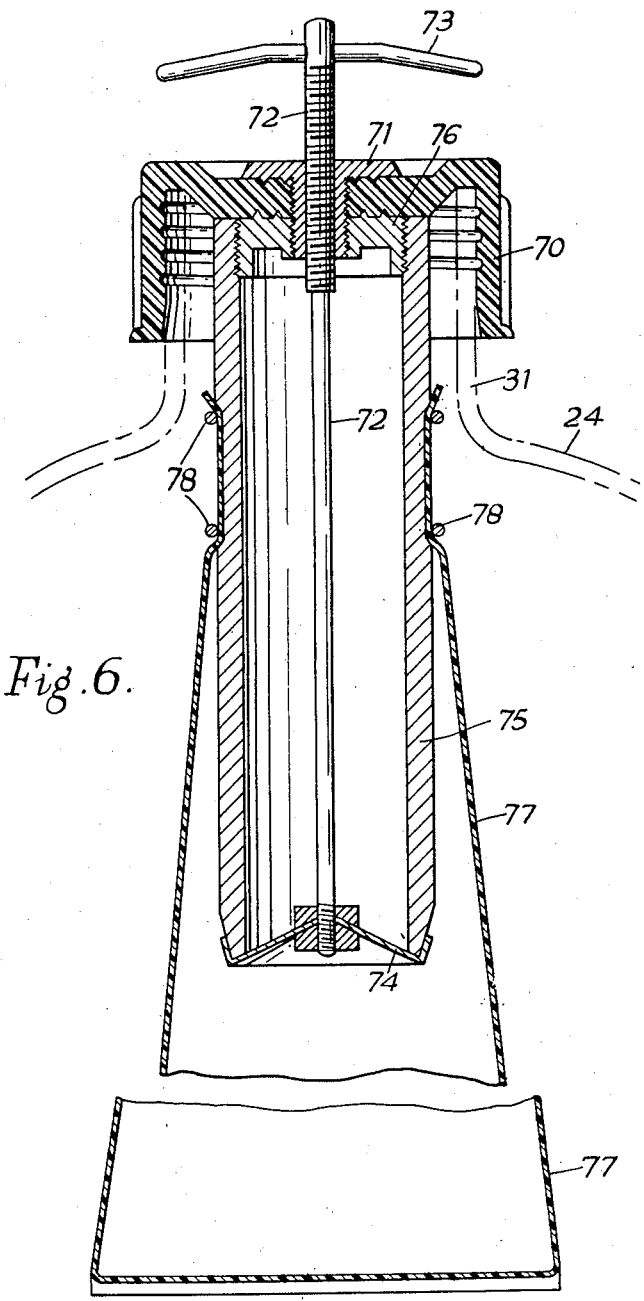
Figure 6 is a sectional view of an alternative arrangement of apparatus, showing only the parts which are modified from those shown in Figure 1.

As an alternative to the valve member 43 or 74 shown respectively in Figures 1 and 6, the lower end of the charge vessel 37 or 75 may be closed by a rubber stopper which is a press fit within the charge vessel. In such an arrangement the rod 42 or 72 is used simply to eject the stopper from the charge vessel to cause water in the charge vessel to fall into the inner container 36 or 77.

In an alternative construction not shown in the drawings, the water charge vessel (37 in Figure 1) is not provided, the charge of water for effecting the reaction being simply poured into the reaction vessel before the shroud 48 is placed over the reaction vessel. With such a construction and method of operation it is necessary to provide chemical reactants which will not produce too violent a reaction before the shroud can be placed over the reaction vessel and the cap screwed on the container.

I claim:

1. Apparatus for producing an aerated liquid of a high degree of purity comprising a container, an outlet pipe extending within said container from a position near to the bottom of said container to an outlet valve in said container, a charge vessel, a displaceable member sealing the otherwise open and lower end of said charge vessel, means operable externally of said container to displace said displaceable member, a reaction vessel comprising an open ended flexible bag made of material impervious to water and inert to acid and alkaline solutions, means suspending said flexible bag from said charge vessel so that the open end of said flexible bag surrounds said charge vessel and for allowing said bag to expand around said open end under gas pressure produced in said bag to permit flow of gas out of said bag.

2. Apparatus for producing an aerated liquid of a high degree of purity comprising a container, an outlet pipe extending within said container from a position near to the bottom of said container to an outlet valve in said container, a reaction vessel, means mounting said reaction vessel within said container, a charge vessel having an outlet, means mounting said charge vessel in a position relative to said reaction vessel such that gravitational liquid flow through said outlet falls into said reaction vessel, means for selectively blocking passage or permitting flow of liquid through said outlet comprising a displaceable member adapted to seal off said outlet and movable between open and closed positions, a rod extending through said charge vessel, one end of said rod engaging said displaceable member, resilient means urging said rod away from said displaceable member, means limiting movement of said rod away from said displaceable member, screw and nut means associated with said rod to cause movement of said rod to displace said displaceable member, said charge vessel being shiftably supported in said container to seal off the outlet of said reaction vessel liquid tight and at least a portion of said charge vessel being adapted to be shifted between open and closed positions by gases formed in said reaction vessel to permit unidirectional flow of gases in said reaction chamber through said reaction chamber outlet and into said container when a predetermined gas pressure is exceeded.

3. An apparatus for producing an aerated liquid of high degree of purity comprising a container adapted to contain the liquid to be aerated and having a removable gas tight cover, a reaction vessel mounted in said container and having an upwardly extending outlet, the interior of said reaction vessel being isolated from said liquid in said container and adapted to contain ingredients that react to form the gas for aerating said liquid, a charge vessel adapted to contain a liquid for reacting with said ingredients in said reaction vessel to form said gas, said charge vessel being positioned in said reaction vessel outlet above the ingredients therein and having an outlet communicating with said reaction vessel above said ingredients, and means selectively movable between open and closed positions for respectively permitting flow of liquid from said charge vessel into said reaction vessel and for blocking passage of liquid flow therebetween, and means supporting said reaction vessel and said charge vessel in sealing relationship to said reaction vessel outlet to provide for separating seal dis-establishing movement between said reaction vessel and said charge vessel when a predetermined gas pressure in said reaction vessel is exceeded to permit flow of fluid from the interior of said reaction vessel into the interior of said container surrounding said reaction vessel.

4. The apparatus as defined in claim 3 wherein a shroud is provided and mounted over and around said charge vessel and said reaction vessel, said shroud extending to a position near the bottom of said container to be adapted to be immersed in the liquid therein whereby gases escaping from said reaction vessel into said container are forced to follow a tortuous path terminating in the liquid in said container.

5. The apparatus as defined in claim 3 wherein at least one of said vessels is deformable by the gas pressure generated in said reaction vessel to provide the separation of said vessels and the dis-establishment of said sealing relationship in response to a predetermined gas pressure within said reaction vessel.

6. Apparatus for producing an aerated liquid of a high degree of purity comprising a container adapted to contain the liquid to be aerated and having a removable gas tight cover, means within the container defining a reaction chamber the interior of which is isolated from said liquid, said reaction chamber being adapted to contain ingredients that react to form the gas for aerating said liquid and having an outlet communicating with the interior of said container, a charge vessel for storing liquid to react with said ingredients to form a gas and means suspending said charge vessel in said container to seal off said reaction chamber outlet liquid tight and to allow at least a portion of said charge vessel to be shiftable by said gases formed in said reaction chamber to permit unidirectional flow of said gases from said reaction chamber into the interior of said container surrounding said reaction chamber when a predetermined gas pressure in said reaction chamber is exceeded, said charge vessel being supported relative to said reaction chamber to permit gravitational flow of fluid therein into said reaction chamber and having a displaceable member selectively sealing off the interior of said charge vessel from communication with said reaction chamber.

References Cited in the file of this patent

UNITED STATES PATENTS

| 1,049,147 | Rebsch | Dec. 31, 1912 |
| 1,237,550 | Pearsons | Aug. 21, 1917 |
| 1,481,026 | Robinson et al. | Jan. 15, 1924 |
| 2,510,269 | Winter | June 6, 1950 |